(No Model.)
J. W. SMITH.
CORN CHECK ROWER.
No. 270,497. Patented Jan. 9, 1883.
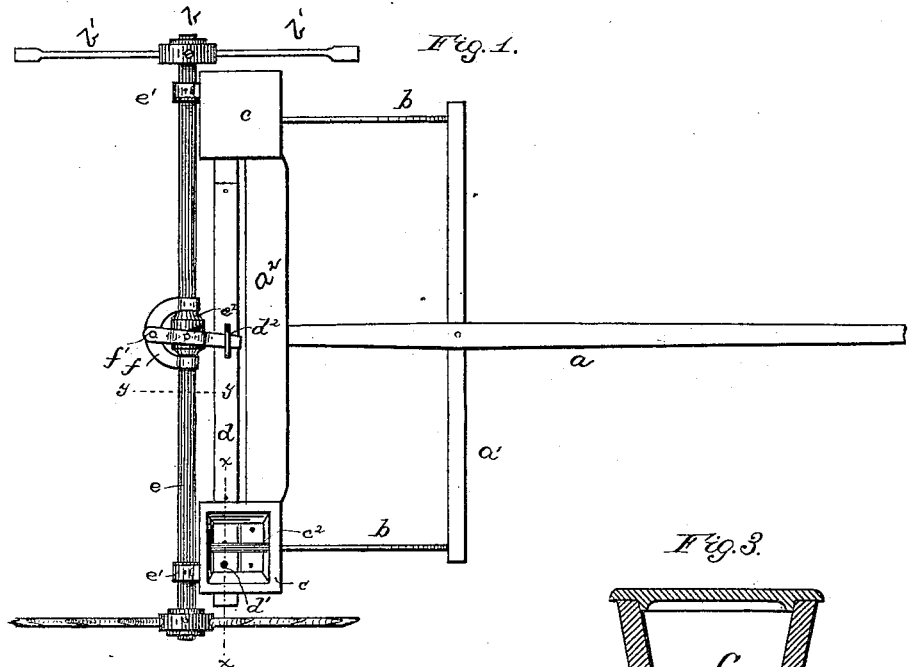
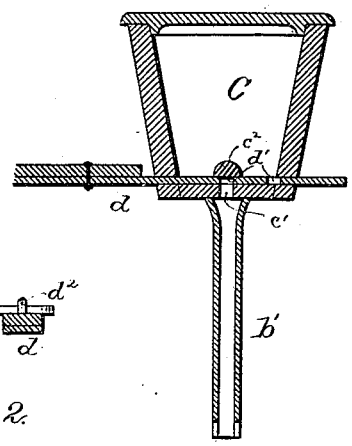
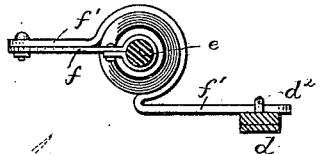
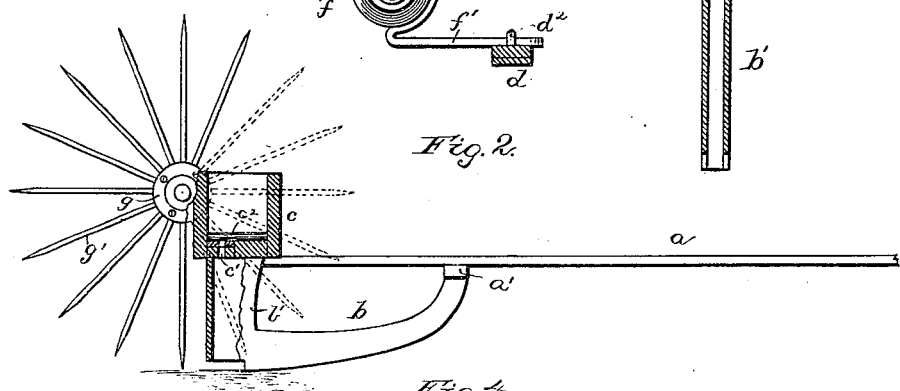
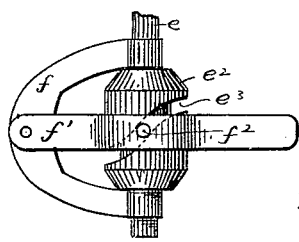
Witnesses:
J. W. Garner
W. J. Osgood
Inventor:
James W. Smith
per Howard A. Snow
Atty.

United States Patent Office.

JAMES W. SMITH, OF GREEN, ASSIGNOR OF ONE-HALF TO JACKSON BROWN, OF LOUISVILLE, KANSAS.

CORN CHECK-ROWER.

SPECIFICATION forming part of Letters Patent No. 270,497, dated January 9, 1883.

Application filed October 21, 1882. (No model.)

*To all whom it may concern:*

Be it known that I, JAMES W. SMITH, a citizen of the United States, residing at Green, in the county of Clay and State of Kansas, have invented certain new and useful Improvements in Corn Check-Rowers, of which the following is a specification, reference being had therein to the accompanying drawings.

This invention relates to improvements in check-row corn-planters; and it consists in the construction, combination, and arrangement of the several parts, as will be hereinafter fully described, and pointed out in the claims.

In the drawings, Figure 1 is a plan view of my machine. Fig. 2 is a side view, showing the grain-box in vertical section. Fig. 3 is a detached sectional view on line $x\ x$, Fig. 1. Fig. 4 is a detached view, showing the mechanism for operating the grain-slide, and Fig. 5 is a section on line $y\ y$, Fig. 1.

In carrying out my invention I employ the bar $a'$, secured centrally to the tongue $a$, and extending at right angles thereto, as shown. To the opposite ends of bar $a'$, I secure the forward end of the sled-runners $b$, which are curved down to the ground and extended rearward, and their standards $b'$ support the grain-boxes, hereinafter described, and are made hollow, so as to deliver the grain from the grain-boxes to the ground in the operation of the machine, as will be described.

$c\ c$ are the grain-boxes, supported on the standard $b'$, and provided with a hole, $c'$, through their bottom board, opening into the hollow standard $b'$.

$c^2$ is a bar secured between the front and rear sides of the grain-box, directly over the opening $c'$, and a sufficient distance above the bottom of the box to permit the grain-slide to move under it.

$a^2$ is a brace-board, secured centrally to the rear of the tongue $a$, and having its opposite ends made fast to the grain-boxes $c$.

$d$ is the grain-slide, the opposite ends of which work through openings in the sides of the boxes $c$ and extend under the bar $c^2$, and are provided with openings $d'$, arranged on opposite sides of the bar $c^2$. This slide is given an oscillating motion by the mechanism hereinafter described, and it will be seen that when the openings $d'$ are out from under the bar $c^2$ they are filled with corn or the other grain being planted, and as the oscillating motion is given to the slide the hole $d'$ comes under the bar $c^2$ over the hole $c'$, and the grain passes through the hole $c'$ and hollow standard $b'$ into the ground.

$d^2$ is a staple or loop, secured on slide $d$, for the purpose hereinafter described.

$e$ is the shaft or axle, which is journaled in bearings $e'$, secured on the rear side of boxes $c$. This shaft is provided with a wheel, $e^2$, which is keyed on the said shaft, and is provided in its periphery with a cam-groove, $e^3$.

$f$ is an arch, having its arms bent around the shaft $e$ on opposite sides of the wheel $e^2$.

$f'$ is the arm which gives the oscillating movement to the grain-slides. Its rear end is pivoted on the arch $f$, and it is carried over the wheel $e^2$ and bent around the under side of said wheel, as shown, so that its rear end cannot be forced up by the arch $f$ being raised by the revolution of the shaft, and the arm $f'$ is carried forward from the under side of the wheel $e^2$, and is extended through the staple $d^2$, forming a connection between the bar $f'$ and the grain-slide.

$f^2$ is a pin projected from the under side of bar $f'$ into the slot $e^3$ in the wheel $e^2$. Thus it will be seen that as the shaft $e$ is revolved the forward end of the arm $f'$ is thrown from side to side, carrying with it the grain-slide and planting the corn.

In order to give the rotating motion to the shaft $e$, I employ the wheel $g$, fixed on one end thereof, and provided with the spokes $g'$. The hub of this wheel I make in two pieces, clamped on either side of the converging ends of the spoke $g'$, and secured together by screws. It will be seen it is but the work of a moment to turn the screws and push the spokes in or draw them out, so as to increase or diminish the circumference of the wheel, so as to plant the hills nearer together or farther apart, as may be required by the condition or nature of the soil being planted. On the opposite end of the shaft $e$, I secure the marker for marking the corn-hills, composed of the hub $b$ and the two marking-arms $b'$, projected radially from the hub in opposite directions. These arms are made adjustable in the hub, so they may be adjusted to correspond to the spokes in wheel $g$.

By this construction it will be seen that my machine may be adjusted to plant ground requiring the hills near together, and also where the hills are necessarily farther apart, as may be required by the nature of the soil or other causes.

Having thus described my invention, what I claim, and desire to secure by Letters Patent, is—

1. In a corn-planter, the mechanism for operating the grain-slide, consisting of a wheel or roller secured upon the axle and having formed around its circumference cam-slot, of an operating-lever pivoted to an arc the ends of which are journaled to the axle upon each side of the cam-wheel, said lever being bent over the top and around the lower side of the cam-wheel, and from thence turned and carried to the grain-slide, to which it is secured in a suitable loop, and said lever is further provided with a pin or stud, which engages with the cam-slot, whereby the revolution of the axle and cam-wheel transmits an oscillating motion to the operating-lever and grain-slide, as set forth.

2. In a seeder, the axle $e$, provided with a wheel, $e^2$, having cam-slot $e^3$ cut around its circumference, in combination with the journaled arc $f$ and pivoted arm $f'$, said arm being provided with a stud, $f^2$, substantially as described, and for the purposes set forth.

3. In a seeding-machine, the shaft $e$, cam-wheel $e^2$, journaled arc $f$, pivoted arm $f'$, provided with stud $f^2$, in combination with the grain-slide $d$, provided with loop $d^2$ to receive the operating arm, substantially as described.

In testimony whereof I affix my signature in presence of two witnesses.

JAMES W. SMITH.

Witnesses:
  S. T. ALLISON,
  F. M. COFFEL.